(12) United States Patent
Pears et al.

(10) Patent No.: US 6,455,611 B1
(45) Date of Patent: Sep. 24, 2002

(54) COLORED POLYURETHANES

(75) Inventors: David Alan Pears, Blackley (GB); John Christopher Padget, Frodsham (GB); Mark Robert James, Blackley (GB); Peter Gregory, Blackley (GB)

(73) Assignee: Avecia Limited, Blackley (GB)

(*) Notice: Subject to any disclaimer, the term of this patent is extended or adjusted under 35 U.S.C. 154(b) by 0 days.

(21) Appl. No.: 09/647,462

(22) PCT Filed: Mar. 25, 1999

(86) PCT No.: PCT/GB99/00784

§ 371 (c)(1),
(2), (4) Date: Sep. 29, 2000

(87) PCT Pub. No.: WO99/50362

PCT Pub. Date: Oct. 7, 1999

(30) Foreign Application Priority Data

Mar. 31, 1998 (GB) .............................................. 9806790

(51) Int. Cl.$^7$ .............................. C09D 11/10; B41J 2/01; B41J 2/17; B41J 2/175; C08G 18/28

(52) U.S. Cl. ................ 523/161; 106/31.13; 106/31.25; 106/31.26; 106/31.27; 106/31.43; 106/31.57; 106/31.6; 106/31.75; 106/31.85; 523/160; 524/591; 524/839; 524/840; 528/49; 528/71; 347/1; 347/86

(58) Field of Search ................................. 524/591, 839, 524/840; 528/49, 71; 523/160, 161; 347/1, 86; 106/31.13, 31.25, 31.26, 31.27, 31.43, 31.57, 31.6, 31.75, 31.85

(56) References Cited

U.S. PATENT DOCUMENTS

| 3,880,797 A | * | 4/1975 | Maeda et al. ................... 528/49 |
| 3,993,619 A | * | 11/1976 | Kruckenberg et al. ......... 528/49 |
| 4,507,407 A | * | 3/1985 | Kluger et al. ................... 528/49 |
| 4,751,254 A | | 6/1988 | Kluger et al. ................. 521/163 |
| 5,919,846 A | * | 7/1999 | Batlaw et al. ................. 524/83 |

FOREIGN PATENT DOCUMENTS

| EP | 769 509 | 4/1997 |
| EP | 816 410 | 1/1998 |
| WO | WO 99/42428 | 8/1999 |

* cited by examiner

Primary Examiner—Rabon Sergent
(74) Attorney, Agent, or Firm—Pillsbury Winthrop LLP

(57) ABSTRACT

The invention relates to polyurethanes, inks comprising polyurethanes and their use in ink jet printing where the polyurethane comprises a colored water-dissipatable polyurethane obtainable by chain-terminating a polyurethane prepolymer with a colorant.

10 Claims, No Drawings

COLORED POLYURETHANES

This invention relates to polyurethanes, to inks comprising polyurethanes and to their use in ink jet printing.

Ink jet printing methods involve a non-impact printing technique for printing an image onto a substrate by ejecting ink droplets through the fine nozzle onto a substrate without bringing the fine nozzle into contact with the substrate.

There are many demanding performance requirements for colorants and inks used in ink jet printing. For example they desirably provide sharp, non-feathered images having good water-fastness, light-fastness and optical density. The inks are often required to dry quickly when applied to a substrate to prevent smudging, but they should not form a crust which would block the tip of the fine nozzle. The inks should also be stable to storage over time without decomposing or forming a precipitate which could also block the fine nozzle. Thermal and piezoelectric ink jet printers are widely used, thus there is a need for inks, suitable for use in both types of printers, having high colour strength and giving images having light fastness and water fastness when printed on a typical substrate, especially plain paper.

EP 0769 509 describes a high molecular weight chain extended polyurethane, formed from a coloured isocyanate-terminated polyurethane prepolymer. However this composition is not ideal for use in ink jet printers with thermal heads because the use of heat can result in nozzle blockage and other operability problems.

It has now been found that coloured polyurethanes according to the present invention can be used to make inks which are suitable for both thermal and piezo ink jet printers.

According to a first aspect of the present invention there is provided a coloured, water-dissipatable polyurethane obtainable from a process comprising the steps:

i) reacting a mixture comprising components (a) and (b) wherein component (a) is at least one organic polyisocyanate and component (b) is at least one isocyanate-reactive compound providing water-dispersing groups; and ii) chain terminating the product of step i) with component (c) wherein component (c) comprises a colorant having a functional group capable of reacting with components (a) or (b).

Preferably the coloured water-dissipatable polyurethane has a weight average molecular weight (Mw) less than 50,000 because this molecular weight leads to an improved performance of inks containing the polyurethane, especially for use in thermal ink jet printers. The Mw of the polyurethane is preferably less than 40,000, more preferably less than 30,000. The Mw of the polyurethane is preferably greater than 1000. Mw may be measured by gel permeation chromatography.

The gel permeation chromatography method used for determining Mw preferably comprises applying the polyurethane to a chromatography column packed with cross-linked polystyrene/divinyl benzene, eluting the column with tetrahydrofuran at a temperature of 40° C. and assessing the Mw of the polyurethane compared to a number of a polystyrene standards of a known Mw. Suitable chromatography columns packed with cross-linked polystyrene/divinyl benzene are commercially available from Polymer Laboratories.

As an alternative to the gpc method for determining Mw one may use other methods, for example multi-angle light scattering.

Component (a) may be any organic polyisocyanate known in the art, preferably having two isocyanate groups, and include aliphatic, cycloaliphatic, aromatic or araliphatic isocyanate. Examples of suitable organic polyisocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenylmethane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred organic polyisocyanates include cycloaliphatic polyisocyanates, especially isophorone diisocyanate, and aliphatic isocyanates, especially 1,6-hexamethylene diisocyanate or hydrogenated 4,4-diphenyl methyl diisocyanate. A small quantity of triisocyanates may be included as part of component (a) but this amount preferably does not exceed 5% by weight relative to the total weight of component (a). In a preferred embodiment component (a) consists of a mixture of diisocyanate and from 0 to 5% of triisocyanate by weight relative to the diisocyanate.

Component (b) providing water-dispersing groups preferably has at least one, and preferably has two, isocyanate-reactive groups. Preferred isocyanate-reactive groups are selected from —OH, —NH$_2$, —NH— and —SH. Isocyanate-reactive compounds having three isocyanate-reactive groups may be present as part of component (b), preferably in low levels not exceeding 5% by weight relative to the total weight of component (b). These isocyanate-reactive groups are capable of reacting with an isocyanate (—NCO) group in component (a) or component (c). Preferably components (a) and (b) are colourless.

The water-dispersing groups are preferably present in the polyurethane as in-chain, pendant or terminal groups. Further water-dispersing groups may be introduced into the polyurethane as a capping reagent having one isocyanate or isocyanate-reactive group and a water-dispersing group.

The nature and level of water-dispersing groups in the polyurethane influences whether a solution, dispersion, emulsion or suspension is formed on dissipation of the polyurethane.

The water-dispersing group content of the polyurethane may vary within wide limits but is usually selected to be sufficient to ensure the polyurethane forms stable ink-jet printing inks in water and aqueous media. The polyurethane is preferably soluble in water, although minor amount of the polyurethane may be insoluble in water and exist as dispersed particles when mixed with aqueous media or water. Preferably the proportion of insoluble polyurethane is less than 50%, preferably less than 40% and most preferably less than 30% by weight relative to the total weight of the polyurethane.

The water-dispersing groups may be ionic, non-ionic or a mixture of ionic and non-ionic water-dispersing groups. Preferred ionic water-dispersing groups include cationic quaternary ammonium groups and anionic sulphonic acid groups, phosphonic acid groups and carboxylic acid groups.

The ionic water-dispersing groups may be incorporated into the polyurethane in the form of a low molecular weight polyol or polyamine bearing the appropriate ionic water-dispersing groups. Preferred isocyanate-reactive compounds providing water-dispersing groups are diols having one or more carboxylic acid groups and/or sulphonic acid groups, more preferably dihydroxy alkanoic acids, especially 2,2-dimethylol propionic acid and/or bis(2-hydroxyethyl)-5-sodiosulphoisopthalate.

The carboxylic and sulphonic acid groups may be subsequently fully or partially neutralised with a base containing a cationic charge to give a salt. If the carboxylic or sulphonic acid groups are used in combination with a non-ionic water-dispersing group, neutralisation may not be required. The conversion of any free acid groups into the corresponding salt may be effected during the preparation of the polyurethane and/or during the preparation of an ink from the polyurethane.

Preferably the base used to neutralise any acid water-dispersing groups is ammonia, an amine or an inorganic base. Suitable amines are tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the ink which is prepared from the polyurethane. For example, suitable counter ions include $Li^+$, $Na^+$, $K^+$, $NH_4^+$, $Cs^+$, and substituted ammonium salts, including tributylammonium, tetrabutyl ammonium, imidazolium, tetraethylammonium, tetrabutyl phosphonium and trimethylsuphonium salts. $NH_4^+$ is especially preferred. Prefered non-ionic water-dispersing groups are in-chain, terminal and pendant polyoxyalkylene groups, more preferably polyoxypropylene and polyoxyethylene groups. Examples include groups of the formula: $RO(CH_2CH_2O)_nH$, $RO(CH_2CH_2O)_n(CH_2CH(CH_3)O)_yCH_2CH(CH_3)NH_2$, or $H_2NCH(CH_3)CH_2(CH(CH_3)CH_2O)_y(CH_2CH_2O)_n(CH_2CH(CH_3)O)_yCH_2CH(CH_3)NR^1R^1$, wherein n=1 to 100, R is H or $CH_3$, each $R^1$ independently is H or a substituted or unsubstituted $C_{1-10}$ alkyl group (especially —$CH_2CH_2$—OH) and y=2 to 15.

Optionally the mixture comprising components (a) and (b) in step i) further comprises an isocyanate-reactive compound which is free from water-dispersing groups. Preferably these compounds which are free from water-dipersing groups are organic polyols or polyamines having a number average molecular weight up to 3000, more preferably up to 2000, especially from 400 to 2000. Preferred organic polyols include diols which are free from water-dispersing groups and mixtures thereof. Such diols may be members of any of the chemical classes of polymeric diols used or proposed to be used in polyurethane formulations. In particular, the diols may be polyesters, polyesteramides, polyethers (other than ones providing polyethyleneoxide and/or polypropyleneoxide groups), polythioethers, polycarbonates, polyacetals, polyolefins or polysiloxanes.

Further examples of optional diols which are free from water-dispersing groups include organic diols and polyols having number average molecular weights below 400. Examples of such diols and polyols include ethylene glycol, diethylene glycol, tetraethylene glycol, bis(hydroxyethyl) terephthalate, cyclohexane dimethanol, furan dimethanol, polyethylene glycol and polypropylene glycol.

When the mixture comprising components (a) and (b) contains an isocyanate-reactive compound which is free from water-dispersing groups this is preferably present in relatively small amounts.

Preferably step i) is performed in an organic solvent or as a melt comprising components (a) and (b). Preferably step i) is performed under anhydrous conditions.

The relative amounts of components (a) and (b) are preferably selected such that the mole ratio of isocyanate groups to isocyanate-reactive groups is greater than 1:1. The relative amounts of components (a) and (b) are preferably selected such that the mole ratio of isocyanate groups to isocyanate-reactive groups is from 1.1:1 to 2:1, preferably from 1.2:1 to 2:1. Alternatively an isocyanate-reactive group terminated prepolymer may be prepared such that the mole ratio of isocyanate groups to isocyanate-reactive groups is from about 1:1 to 1:2, preferably from about 1:1 to 1:1.3.

If desired a catalyst may be used in step i) and or step ii) to assist polyurethane formation. Suitable catalysts include butyl tin dilaurate, stannous octoate and tertiary amines as known in the art.

An organic solvent may optionally be included in step i) to lower the viscosity of the mixture. Preferably a water-miscible solvent is used, for example N-methylpyrrolidone, dimethyl sulphoxide, a dialkyl ether of a glycol acetate, methy ethyl ketone or a mixture thereof. Step i) is usually continued until the reaction between components (a) and (b) is substantially complete, giving either an isocyanate-terminated or isocyanate-reactive group terminated prepolymer.

The function of component (c) is to colour and to chain terminate the product of step i). Thus component (c) is used to cap-off any excess isocyanate or isocyanate-reactive end groups in the polyurethane resulting from the reaction of components (a) and (b) in step i). Component (c) will normally be chosen to have one functional group capable of reacting with the terminal groups on the product of step i). For example, if the product of step i) has terminal isocyanate groups then component (c) may be selected to have one isocyanate reactive group, if the product of step i) has terminal isocyanate-reactive groups then component (c) may be selected to have one isocyanate group, and if the product of step i) has a terminal isocyanate group and a terminal isocyanate-reactive group then component (c) may be selected to be a mixture of colorants each of which has either one isocyanate-reactive group or one isocyanate group.

The colorant preferably comprises a chromophoric group and one functional group selected from isocyanate and isocyanate-reactive groups. However several such functional groups may be present in the colorant provided that one has a higher reactivity than the other(s) to ensure that chain-termination of the polyurethane is the main reaction and not chain extension. The functional group may be attached directly to a chromophoric group or may be attached through a linker group. An example of a suitable linker group is an alkylenediamine attached to a chromophoric group via a triazine ring.

The chromophoric group preferably comprises an azo, anthraquinone, pyrroline, phthalocyanine, polymethine, aryl-carbonium, triphenodioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, pyrroline, benzodifuranone or indolene group. More preferred chromophoric groups are azo groups, especially monoazo, disazo, trisazo and phthalocyanine groups. Especially preferred monoazo groups comprise two aryl groups linked by an azo group where optionally one or both aryl groups and heteraryl groups.

Preferably the colorant is a dye comprising a chromophoric group and one functional group selected from isocyanate and isocyanate-reactive groups. The colorant preferably comprises or consists of from 1 to 10, more preferably 1 to 5, especially 1, 2 or 3 of said dyes. The dye may be soluble in organic solvents and/or in water. Water solubility of the dye may be achieved by the presence of acidic groups in the dye. Preferred acidic groups are phosphonic, carboxylic or sulphonic acids, and combinations and salts thereof.

Component (c) optionally bears water-dispersing groups as hereinbefore described.

The amount of component (c) used in step ii) normally depends on the ratios of components (a) and (b), the amount of chain termination desired and the desired depth of shade.

Component (c) may also include colourless compounds having a functional group capable of reacting with component (a) or (b), e.g. an isocyanate group or an isocyanate-reactive group.

Colourless compounds having one isocyanate-reactive group, include for example, monoalcohols, monohydrazides, mono hydrazines, monoamines and monothiols. Compounds having two isocyanate-reactive functional groups may be included as long as one of the groups is far more reactive with an isocyanate group so that it essentially reacts as monofunctional isocyanate-reactive compound. An example includes ethanolamine where the amine group is far more reactive than the hydroxyl group. Colourless compounds having one isocyanate group include, for example, alkyl monoisocyanates.

Preferably 10 to 100%, more preferably 30 to 100% and most preferably 50 to 100% by weight of component (c) comprises a colorant having a functional groups capable of reacting with component (a) or (b).

Step ii) is preferably performed at a temperature of from 10° C. to 130° C., more preferably 15° C. to 100° C.

Step ii) is preferably performed by mixing the product of step i) with component (c). For example the product of step i) may be added to a solution of component (c) or component (c) may be added to a solution of the product of step i). Alternatively component (c) may be reacted with product of step i), followed by dispersion of the resultant mixture in a solvent and reaction with a further quantity of component (c).

Step ii) may optionally be performed in a solvent, preferably in water, an aqueous solvent or an organic solvent. Component (c) is preferably soluble in the solvent. The product of step ii) may then be dissipated in water.

Some chain-extension may occur during step ii) as a minor side reaction, for example with water. Preferably however the polyurethane is not deliberately chain-extended during step ii). If step ii) is performed in water the conditions are preferably selected such that no substantial chain extension of polyurethane occurs.

The coloured water-dissipatable polyurethane may contain further linkages in addition to urethane linkages, for example urea, amide, thiourea or thiourethane linkages.

Preferably the coloured water-dissipatable polyurethanes according to the first aspect of the present invention have been obtained by the stated process.

Preferably the coloured water-dissipatable polyurethane of the present invention (and any resultant inks) is yellow, magenta, cyan or black.

The coloured water-dissipatable polyurethane of the present invention may be purified if desired in the usual way for colorants used in ink jet printing inks. For example a mixture of the coloured water-dissipatable polyurethane and water may be purified by ion-exchange, filtration, reverse osmosis, dialysis, ultra-filtration or a combination thereof. In this way one may remove co-solvents used for the polymerisation, low molecular weight salts, impurities and free monomers.

In a second aspect of the present invention there is provided an ink comprising a coloured water-dissipatable polyurethane according to the first aspect of the present invention and a liquid medium. A preferred ink comprises:

(a) from 0.25 to 30 parts of a coloured water-dissipatable polyurethane according to the first aspect of the present invention; and (b) up to 99.75 parts of a liquid medium;

wherein all parts are by weight and the number of parts of (a)+(b)=100.

The number of parts of component (a) is preferably from 0.5 to 28, more preferably from 2 to 25, and especially from 2.5 to 20 parts.

The inks according to the second aspect of the invention may be prepared by mixing the coloured water-dissipatable polyurethane with the liquid medium. Suitable techniques are well known in the art, for example agitation, ultrasonication or stirring of the mixture. The mixture of water-dissipatable polyurethane and liquid medium is preferably in the form of a dispersion, emulsification, suspension, solution or mixture thereof.

Preferably the coloured water-dissipatable polyurethane is mixed with a first liquid medium, followed by mixing the resultant mixture with a second liquid medium.

The liquid medium preferably comprises water, a mixture of water and organic solvent or an organic solvent free from water. For example the water-dissipatable polyurethane may be added to water followed by the addition of one or more organic solvents. Preferably the first liquid medium is an organic solvent and the second liquid medium is water or a mixture comprising water and one or more organic solvents.

When the liquid medium comprises a mixture of water and an organic solvent, the weight ratio of water to organic solvent is preferably from 99:1 to 1:99, more preferably from 99:1 to 50:50 and especially from 95:5 to 60:40.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5- pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the polyurethane in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

A preferred liquid medium comprises:
(a) from 75 to 95 parts water; and
(b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

The ink may also contain a surfactant. This helps to dissipate the coloured water-dissipatable polyurethane in addition to the dissipation caused by dispersing groups provided by component ii) of the coloured water-dissipatable polyurethane. Optionally the ink may also contain further additives conventionally used in ink jet inks, for example conductivity agents, defoamers, anti-oxidants, corrosion inhibitors, bacteriocides and viscosity modifiers.

The ink preferably has a pH of from 3 to 11, more preferably of from 4 to 10. Such a pH may be obtained by the addition of a base, acid or a pH buffer. When a base is used this is preferably the same base as was used to neutralise the anionic dispersing group during the preparation of the polyurethane.

The viscosity of the ink is preferably less than 20 cp, more preferably less than 10 cp, at 20° C.

Preferably the ink has been filtered through a filter having a mean pore size below 10 μm, preferably below 5 μm, more preferably below 2 μm, especially approximately 0.45 μm. In this way particulate matter is removed which could otherwise block the fine nozzle in an ink jet printer.

The inks of the second aspect of the present invention have the advantage that they are suitable not only for the use of piezoelectric ink jet printers but also for the use of thermal and continuous ink jet printers. They form discrete droplets on the substrate with little tendency for diffusing. Consequently sharp images with excellent print quality and little if any bleed between colours printed side by side can be obtained. Furthermore the inks show good storage stability, wet and light-fastness and fastness to both acidic and alkaline highlighter pens.

A further aspect of the invention provides a process for printing an image on a substrate comprising applying thereto an ink containing a coloured water-dissipatable polyurethane of the present invention by means of an ink jet printer.

The ink used in this process is preferably as defined in the second aspect of the present invention.

The ink jet printer preferably applies the ink to the substrate in the form of droplets which are ejected through a small nozzle onto the substrate. Preferred ink jet printers are piezoelectric ink jet printers and thermal ink jet printers. In thermal ink jet printers, programmed pulses of heat are applied to the ink in a reservoir by means of a resistor adjacent to the nozzle, thereby causing the ink to be ejected in the form of small droplets directed towards the substrate during relative movement between the substrate and the nozzle. In piezoelectric ink jet printers the oscillation of a small crystal causes ejection of the ink from the nozzle.

The substrate is preferably paper, plastic, a textile, metal or glass, more preferably paper, an overhead projector slide or a textile material, especially paper.

Preferred papers are plain, coated or treated papers which may have an acid, alkaline or neutral character. Most preferably the substrate is a plain or coated paper.

According to a further feature of the invention there is provided an ink jet printer cartridge containing an ink as hereinbefore defined.

The invention will now be described by example only. All parts and percentages are by weight unless specified otherwise. In the examples, compounds referred to by reference to CI numbers are the dyestuffs identified by these numbers in the Colour Index International, $3^{rd}$ Edition, $3^{rd}$ Revision.

EXAMPLE 1

Preparation of a Magenta Water Dissipatable Coloured Polyurethane

Stage i)

A magenta dye of formula 1 was prepared as the ammonium salt as described below:

Formula 1

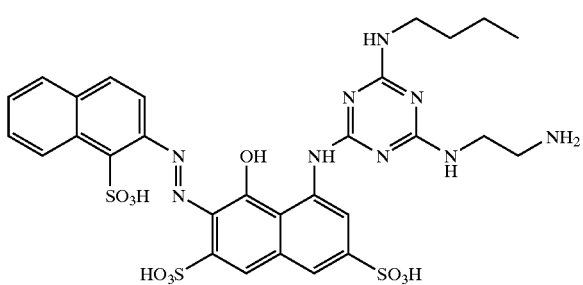

A pre-filtered solution of CI Reactive Red 11 (a dichlorotriazinyl dye) (120 parts) was dissolved in distilled water (1500 parts). n-Butylamine (8 parts) was dissolved in acetone (50 parts) and added dropwise while maintaining the temperature at 25° C. and the pH at 8.4 by the addition of 2N NaOH. The mixture was stirred for a further 1 hour and then an additional charge of n-Butylamine (2 parts) in acetone (20 parts) was added while maintaining the temperature at 25° C. and the pH at 8.4. After a further hour, two further charges on n-butylamine (2 parts) in acetone (20 parts) were made before the reaction was shown to be complete by high performance liquid chromatography (HPLC). The resultant intermediate was precipitated from the cooled reaction mixture by the addition of 30% aqueous salt solution and acidification to pH 2 by the addition of 2 N hydrochloric acid. The intermediate was isolated by filtration and washed with 1 N hydrochloric acid. The intermediate was dissolved in water (1000 parts) and added dropwise to a stirred solution of ethylene diamine (60 parts) in distilled water (1000 parts) at 70° C. The mixture was stirred at 70° C. for a further 2 hours and at room temperature for two days at which point HPLC analysis indicated that no starting mate- Step ii): Chain Termination with a Colorant The polyurethane pre-polymer from step i) (6.32 g) at 90° C. was dispersed into a mixture of components 6 and 7 (40.55 g) initially at 30° C. The mixture was stirred for a further 1.5 hours and then cooled to room temperature before being filtered through a 50 μm cloth filter.

The resultant coloured water-dissipatable polyurethane was found to have a solids content of 8.46%, a pH of 9.96 and an Mw determined by gel permeation chromatography of 4233 (Mn=1446).

EXAMPLE 2

Preparation of a Water-dissipatable Coloured Polyurethane

Stage i): Preparation of Dye 2

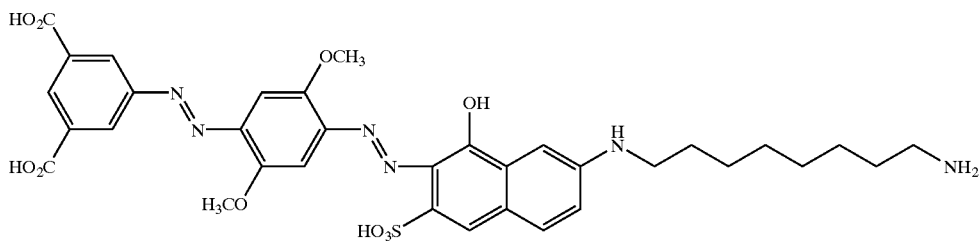

Formula 2 rial remained. Sodium chloride (10% w/w) was added to the mixture followed by acidification to pH 2.5 by the addition of concentrated hydrochloric acid. The resultant product was isolated by filtration, washed with a little cold water, dried at 50° C., slurred in methanol, isolated by filtration, washed with a little cold water and methanol and dried. The product was dissolved in distilled water, filtered through a cascade of filters (Glass microfibre GF/A, GF/F and membrane) to 0.45 micron and then desalinated by reverse osmosis using a 500 MW cut off membrane and evaporated to dryness to yield the dye of Formula 1 (37.5 parts).

Stage ii)

The dye of Formula 1 from stage i) in the form of an ammonium salt was then used to chain terminate a polyurethane prepolymer using the method as described in steps i) and ii) below and the components described below in Table 1.

TABLE 1

| Number | Component | Weight(g) |
| --- | --- | --- |
| 1 | Isophorone diisocyanate | 28.44 |
| 2 | polypropylene glycol of molecular weight 1000 | 40.56 |
| 3 | dimethylol propionic acid | 6.00 |
| 4 | N-methylpyrrolidone | 18.75 |
| 5 | dibutyl tin dilaurate | 0.08 |
| 6 | magenta dye ammonium salt from stage i) | 2.55 |
| 7 | Distilled water, pH adjusted to 10.22 with 25% aqueous ammonia. | 38 |

Step i): Preparation of a Polyurethane Prepolymer

Components 1, 2, 3, and 4 were charged to a stirred reaction vessel under a nitrogen atmosphere and heated to 90° C. then component 5 was added. The reaction exothermed by about 3° C. and was then maintained at 90–95° C. for 3 hours to give a polyurethane prepolymer. After 3 hours the NCO content of the reaction mixture was found to be 3.74%. The mixture was reduced in solids to 50% using N-methylpyrrolidone.

The dye Formula 2 was prepared as described in steps a), b) and c) below.

Step a): Preparation of a Mono-azo Intermediate of Formula 3

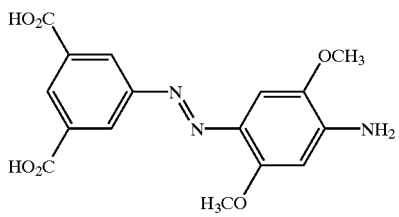

Formula 3

5-aminoisophthalic acid (109 parts) and sodium nitrite (46 parts) were dissolved in water (1000 parts) with the addition of 2N sodium hydroxide to f pH 7.7. The resultant solution was added slowly to concentrated hydrochloric acid (180 parts) at 0–10° C. The mixture was stirred for 2 hours at 0–10° C. to react to give a diazonium salt. Excess nitrous acid was destroyed by the addition of sulfamic acid until starch paper failed show an immediate change.

A solution of 2,4-dimethoxyaniline (92 parts) in methylated spirits (2000 parts) was added slowly to the above diazonium salt and stirred at 0–10° C. The mixture was maintained at a temperature of 0–10° C. by the addition of ice during the addition and then stirred for 2 hours at this temperature. Water (4000 parts) was added and the mixture stirred overnight at room temperature. The mixture was filtered and the resultant precipitate was isolated by filtration and stirred in 2N hydrochloric acid (1500 parts). The resultant slurry was filtered and the precipitate thus obtained was oven dried at 40° C. to produce the compound of Formula 3 (364 parts).

Step b) Preparation of a Napthalene Intermediate of Formula 4

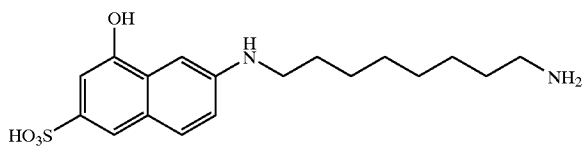

Formula 4

A mixture of 2,8-dihydroxy-6-naphthalene sulfonic acid (263 parts), sodium hydrogen sulphite (259 parts), water (900 parts) and 1,8-diaminooctane (400 parts) were reacted while stirring at 80° C. for 20 hours and then for a further 20 hours at 95° C. The reaction was allowed to cool over night and filtered. The resultant precipitate was isolated by filtration and stirred in water (500 parts) and 2N sodium hydroxide (750 parts) for 15 minutes. 2N Hydrochloric acid (300 parts) was added and the precipitate filtered. The precipitate was dissolved in water (500 parts) and 2N sodium hydroxide (1000 parts) by heating to 50° C. 2N Hydrochloric acid was added and the precipitate filtered at 40° C. The precipitate was oven dried at 70° C. to produce the required naphthalene intermediate (111 parts).

Step c): Preparation of the Dye of Formula 2

The product of step a) (105 parts) and sodium nitrite (20 parts) were dissolved in water (1000 parts) with the addition of 2N sodium hydroxide to pH 9.0. The resulting solution was added to concentrated hydrochloric acid (100 parts) and water (400 parts) and reacted while stirring with a high shear mixer at ambient temperature for 1.25 hours to give a diazonium salt. Excess nitrous acid was destroyed by addition of sulfamic acid until starch paper showed no immediate change.

The diazonium salt was added slowly to a solution of the product of step b) (96 parts) in water (1000 parts) which had previously been adjusted to pH 11 using sodium carbonate (50 parts) and 2N sodium hydroxide. The temperature during the addition was maintained at 0–10° C. by the addition of ice and the pH maintained at 10–11 by addition of 2N sodium hydroxide. The solution was stirred for 2 hours at 0–10° C. and overnight at room temperature. The solution was adjusted to pH 6.5 with concentrated hydrochloric acid and the precipitate filtered. The resultant precipitate was dissolved in water (500 parts) with the addition of concentrated ammonia (750 parts). Concentrated hydrochloric acid (500 parts) was added and the precipitate filtered. This process was repeated and the resultant precipitate suspended in water (700 parts) and concentrated ammonia (200 parts). The suspension was dialysed to <100 µs/cm and screened at 60° C. using glass microfibre GF/D filter paper. The solvent was evaporated to dryness at 80° C. to yield the dye of Formula 2 as the ammonium salt (127 parts).

An ion exchange column packed with strongly acidic resin ($H^+$ form) was flushed with an aqueous solution of triethylamine (5% v/v) until the elluent tested basic with indicator paper pH 8–10. The ammonium salt of the dye of Formula 2 (66 parts) was dissolved in water (1300 parts) with the addition of triethylamine to pH 9.0 and passed through the column. Water was flushed through the column until the elluent appeared to have very little colour. The solvent was evaporated to dryness to yield the triethylamine salt of the dye of formula 2 (72 parts).

Stage ii)

The triethylamine salt of the dye of Formula 2 prepared in stage i) was then used to chain terminate a polyurethane prepolymer using the method as described below in steps i) and ii) and the components as described below in table 2.

TABLE 2

| Number | Component | Weight(g) |
|---|---|---|
| 1 | Isophorone Diisocyanate | 11.38 |
| 2 | Polypropylene Glycol of molecular weight 1000 | 16.22 |
| 3 | Dimethylol Propionic Acid | 2.40 |
| 4 | N-Methylpyrrolidinone | 7.50 |
| 5 | N-Methylpyrrolidinone | 22.50 |
| 6 | Triethylamine | 0.47 |
| 7 | N-Methylpyrrolidinone | 20.00 |
| 8 | Dye of formula 2 from stage i) | 7.30 |

Step i): Preparation of Polyurethane Prepolymer

Components 1,2,3 and 4 were charged to a stirred reaction vessel under a nitrogen atmosphere and heated to 100° C. The reaction mixture was then maintained at 100° C. for 3 hours to give a polyurethane prepolymer. Component 5 was then added to reduce the overall solids to 50%. A sample of the reaction mixture (4.0 g) was removed to determine the %NCO content which was found to be 2.14% NCO. Component 6 was then added to a portion of the prepolymer (14.78 g) at 70° C. and this temperature was maintained for a further 30 minutes. The reaction mixture was then cooled to 40–45° C.

Step ii): Chain Termination with a Colorant

Components 7 and 8 were added to the reaction mixture prepared in stage ii), step i). The reaction mixture was then re-heated back to 70° C. and held at this temperature for a further 30 minutes to give a coloured polyurethane polymer solution.

The polymer solution (58.04 g) at 70° C. was dispersed into 84.35 g of stirred distilled water initially at 30° C. During the addition of the polymer solution to the water to give a dispersion the temperature of the water rose to about 49.1° C. The dispersion was stirred for a further one hour, cooled to room temperature and filtered through a 50 µm cloth filter.

The resultant dispersion of the coloured water-dissipatable polyurethane was found to have a solids content of 9.42%, a pH of 6.13, and an Mw as determined by gel permeation chromatography of 10,180 (Mn=5008).

Preparation of Inks from the Coloured Water-Dissipatable Polyurethanes Prepared in Examples 1 and 2

The coloured polyurethane polymers prepared in Examples 1 and 2 respectively were diluted with water (150 parts) and adjusted to pH 10 using concentrated ammonia. The resultant solutions were screened though a cascade of filters (Glass microfibre GF/A, GF/F and membrane) to 0.45 micron and then purified by reverse osmosis using a 100000 MW cut off membrane. The solvent was evaporated to dryness at 70° C. to give purified coloured water-dissipatable polyurethanes.

Inks were prepared by dissolving 15 parts of colorant [i.e. the purified coloured water-dissipatable polyurethanes of Examples 1 and 2 respectively] in a stock solution of 9 parts water and 1 part 1-methyl-2-pyrrolidinone with the addition of concentrated ammonia to give a pH of 9–10. The inks were filtered through a 0.45 micron membrane filter and a series of vertical and horizontal bars were printed onto Conqueror High White Wove plain paper 100 g/m² from Arjo Wiggins Ltd., white Gilbert Bond paper or white Xerox Acid paper using a HP 560 Thermal Ink Jet printer to give test prints. The properties of the resultant test prints are shown in Table 3 below.

TABLE 3

| Colorant | Parts of Colorant | Paper | Optical Density | l = lightness | a = colour coordinate | b = colour coordinate | Wet fastness (24 h) |
|---|---|---|---|---|---|---|---|
| Example 1 | 15 | Conqueror | 1.22 | 42.78 | 55.06 | −3.84 | 7 |
| Example 2 | 15 | Gilbert Bond | 1.06 | 35.02 | 4.57 | −2.29 | 10 |
| Example 2 | 15 | Xerox Acid | 1.03 | 35.41 | 4.88 | −2.84 | 10 |

Highlighter Test

The test prints prepared above were tested for smear resistance to highlighter pens. Yellow highlighter pens (acid and alkaline) were used to draw a horizontal line across the series of printed vertical bars. The amount of ink smear on the white paper between the vertical bars was assessed visually. Prints prepared from the inks containing the water-dissipatable coloured polyurethanes prepared in Examples 1 and 2 were fast to both acid and alkaline highlighter pens.

Wet fastness

Wet fastness was determined as follows; 0.5 cm³ of water was run down repeating post west fastness the test prints prepared above 24 hours after printing. The wet fastness was scored on a scale of from 1 to 10, with 1 representing poor wet fastness and 10 producing no stain on the white paper.

Colour Coordinates, Lightness and Optical Density

Colour coordinates, L a b and the optical density were measured on test prints prepared above using an X-rite 938 spectrophotometer.

The optical density is a measure of colour strength on a logarithmic scale.

The colour coordinates define the brightness and colour on a colour scale, where 'a' is a measure of redness (+a) or greenness (−a) and 'b' is a measure of yellowness (+b) or blueness (−b). The coordinates 'a' and 'b' approach zero for neutral colours (white, grays and blacks). The higher the values 'a' and 'b' are, the more saturated a colour is.

The lightness 'L' is measured on a scale from 0 (white) to 100 (black).

Inks

Further inks may be prepared having the formulations described in Table 4 below wherein the following abbreviations are used. Water may be included in each formulation to make the total number of parts up to 100. These inks may be applied to plain paper using an ink jet printer.

FRU: fructose
PU*: coloured water-dissipatable Polyurethanes as prepared in examples 1 and 2. The number of parts by weight of PU is shown in brackets.
BZ: Benzyl alcohol
DG: Diethylene glycol
DMB: Diethyleneglycol monobutyl ether
AC: Acetone
IPA: Isopropyl alcohol
M: Methanol
2P: 2-Pyrollidone
MBK: Methylisobutyl ketone
SUR: Surfynol 465 (a surfactant)
PHO: $K_2PO_4$
TEN: triethanolamine
NMP: N-methylpyrollidone
TDG: Thiodiglycol
CAP: Caprolactam
BC: Butylcellosolve
GLY: Glycerol
NH: Sodium Hydroxide
AS: Ammonium sulphate $(NH_4)_2SO_4$
MA: Methyl amine $CH_3NH_2$

TABLE 4

| PU* (parts) | BZ | DG | AC | NH | AS | IPA | M | 2P | MBK | GLY | NMP | BC | SUR | TEN | TDG | FRU | PHO | DMB | MA | CAP |
|---|---|---|---|---|---|---|---|---|---|---|---|---|---|---|---|---|---|---|---|---|
| 1 (10) | | 6 | 4 | 0.1 | | | 1 | 9 | 1 | | 10 | | 0.15 | 0.4 | 18 | 0.3 | | 2 | | |
| 2 (10) | 6 | 4 | | 0.2 | | | 15 | 9 | 1 | | 10 | | | | | 0.12 | | | | 4 |
| 2 (6) | 8 | | 5 | | | | | 5 | 2 | 3 | 15 | 3 | 0.2 | | 15 | | | | 0.2 | |
| 2 (12) | | 9 | | 0.5 | 0.5 | | | | | | 2 | | | | 0.5 | 0.2 | | 4 | | 1 |
| 1 (4) | | 3 | | | | | 3 | 4 | | | | | | 5 | | | | | | |
| 1 (16) | 19 | | | | | 10 | | | | | 4 | | | | | | | 4 | 0.2 | |
| 1 (5) | 4 | | 4 | | | | 6 | 15 | 4 | | | 2 | | | 2 | | | | | |
| 2 (17) | | 2 | 10 | 0.2 | 0.3 | | | | | | 10 | | | 0.5 | | | | 5 | | |
| 1 (4) | 4 | | | | | 5 | 5 | 4 | | | | | | 9 | | | | 6 | | 1 |
| 2 (11) | 7 | 2 | 2 | | | 3 | 4 | | 5 | | | | | | | | | | | |
| 1 (11) | 6 | | | | | | | | | | | 3 | 0.1 | 0.2 | | 0.5 | 0.1 | 5 | | 3 |
| 1 (12) | | 1 | 9 | | | | 2 | 6 | | | | | | | 11 | | | | | |
| 2 (5) | | 7 | | 0.1 | 3 | | 10 | | 1 | | | | 0.1 | | | | | 5 | | |
| 1 (4) | 19 | 2 | 2 | | | | 15 | 2 | | | 3 | | | | | 0.2 | | 12 | | |
| 2 (8) | 5 | 2 | | | 0.1 | | 15 | 1 | | | 10 | 1 | | 1 | 1 | | | | 1 | 1 |

(Water is included in each formulation to make the total number of parts up to 100)

What is claimed is:

1. An ink comprising a coloured, water-dissipatable polyurethane obtained by a process comprising the steps:

i) reacting a mixture comprising components (a) and (b) wherein component (a) is at least one organic polyisocyanate and component (b) is at least one isocyanate-reactive compound providing water-dispersing groups; and ii) chain terminating the product of step i) with component (c) where component (c) comprises a colorant having a functional group capable of reacting with components (a) or (b); and a liquid medium, wherein the ink has a viscosity less than 20 cp at 20° C.

2. An ink according to claim 1, wherein step ii) is performed in water.

3. An ink according to claim 1, wherein step ii) is performed at a temperature of from 10° C. to 130° C.

4. An ink according to claim 1, wherein step ii) is performed in organic solvent.

5. An ink according to claim 1, wherein said polyurethane is soluble in water.

6. An ink according to claim 1, wherein said polyurethane has a Mw less than 50,000.

7. An ink according to claim 1, which has been filtered through a filter having a mean pore size below 10 $\mu$m.

8. An ink according to claim 1, which is yellow, magenta, cyan or black.

9. A process for printing an image on a substrate comprising applying thereto an ink according to claim 1, by means of an ink jet printer.

10. An ink jet printer cartridge containing an ink according to claim 1.

* * * * *